United States Patent [19]

Honjo et al.

[11] Patent Number: 5,600,580
[45] Date of Patent: Feb. 4, 1997

[54] NOTEBOOK TYPE INFORMATION PROCESSING APPARATUS HAVING INPUT FUNCTION WITH PEN

[75] Inventors: Kaori Honjo; Masami Kashiwakura, both of Tokyo; Takaya Suzuki, Yamagata; Toru Akasaka, Yamagata; Hiroshi Onishi, Yamagata, all of Japan

[73] Assignee: NEC Corporation, Tokyo, Japan

[21] Appl. No.: 468,334

[22] Filed: Jun. 6, 1995

Related U.S. Application Data

[63] Continuation of Ser. No. 159,228, Nov. 30, 1993, abandoned.

[30] Foreign Application Priority Data

Nov. 30, 1992 [JP] Japan .................................... 4-320977
Dec. 3, 1992 [JP] Japan .................................... 4-324108

[51] Int. Cl.⁶ ............................... G06F 1/16; G06F 15/16
[52] U.S. Cl. ............................... 364/708.1; 364/705.03
[58] Field of Search ........................... 364/708.1, 706, 364/705.03; 361/681, 683; 248/917, 918, 919, 920, 921, 922

[56] References Cited

U.S. PATENT DOCUMENTS

| | | | |
|---|---|---|---|
| 4,749,364 | 6/1988 | Arney et al. | 364/708.1 |
| 5,049,862 | 9/1991 | Dao et al. | 360/706 |
| 5,138,565 | 8/1992 | Satou | 364/708.1 |
| 5,240,427 | 8/1993 | Kobayashi | 364/708.1 |
| 5,241,303 | 8/1993 | Register et al. | 364/708.1 |
| 5,268,817 | 12/1993 | Miyagawa et al. | 364/708.1 |
| 5,333,116 | 7/1994 | Hawkins et al. | 364/708.1 |

FOREIGN PATENT DOCUMENTS

| | | |
|---|---|---|
| 0454120 | 10/1991 | European Pat. Off. . |
| 9210478 | 12/1992 | Germany . |
| 6339731 | 5/1988 | Japan . |
| 9105327 | 4/1991 | WIPO . |

*Primary Examiner*—Roy Envall
*Assistant Examiner*—Emmanuel L. Moise
*Attorney, Agent, or Firm*—Sughrue, Mion, Zinn, Macpeak & Seas

[57] ABSTRACT

A notebook type information processing apparatus includes a display and an apparatus body. The display has a screen on one side for displaying data, a support supporting the screen rotatably, a first connector provided on the bottom of the support and connectable to the apparatus body mechanically and electrically, and a latch that is rotatable 180 degrees for locking the display to the apparatus body in either a normal position or an inverted position. The apparatus body has a groove engageable with the support and located at the rear of a keyboard, a second connector positioned in the groove and connectable to the first connector mechanically and electrically, a pair of rotatable levers engageable with opposite ends of the support for locking the display, a control section for generating control signals meant for the screen, a position detecting circuit for determining whether the display is mounted in the normal or inverted positions, and a selector circuit for selectively outputting the control signals from the control section on the basis of the output of the detecting circuit. Hence, the apparatus allows the user to enter data and commands with a pen easily, reduces the fatigue of the user's arm, and allows the entering operation to be continued for a long time.

4 Claims, 10 Drawing Sheets

FIG. 2A
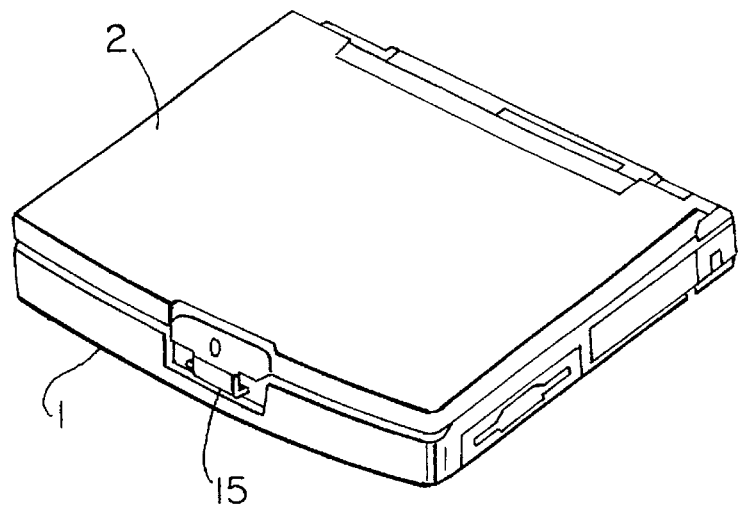
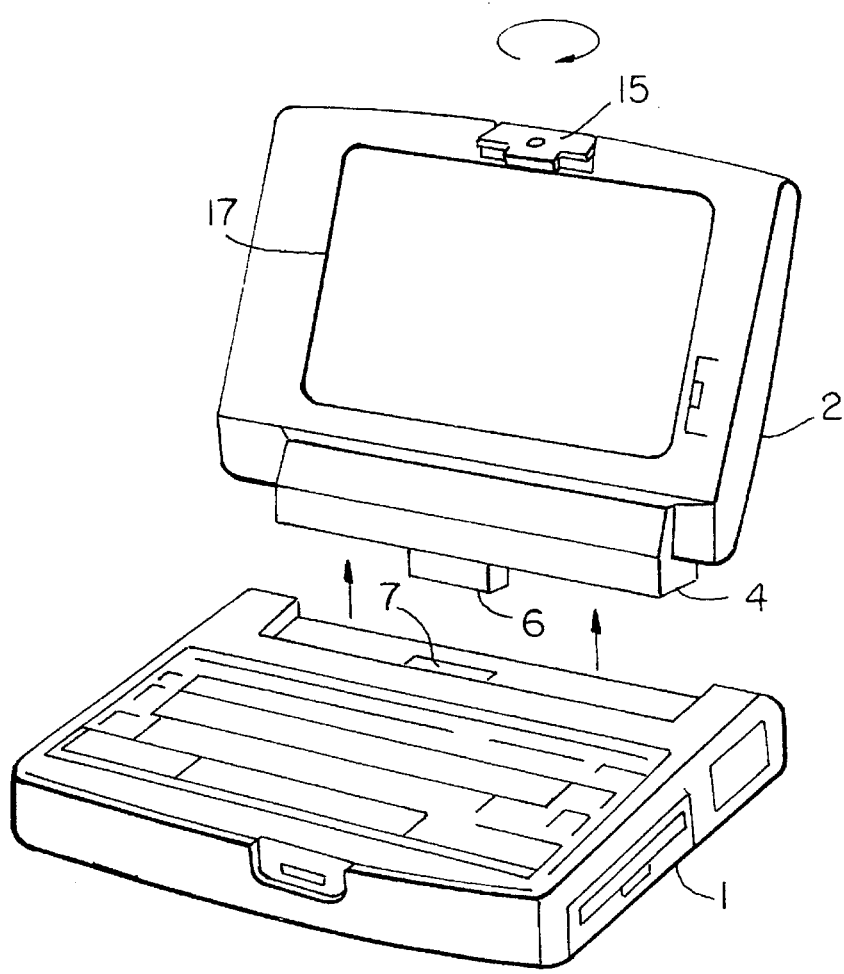
FIG. 2B

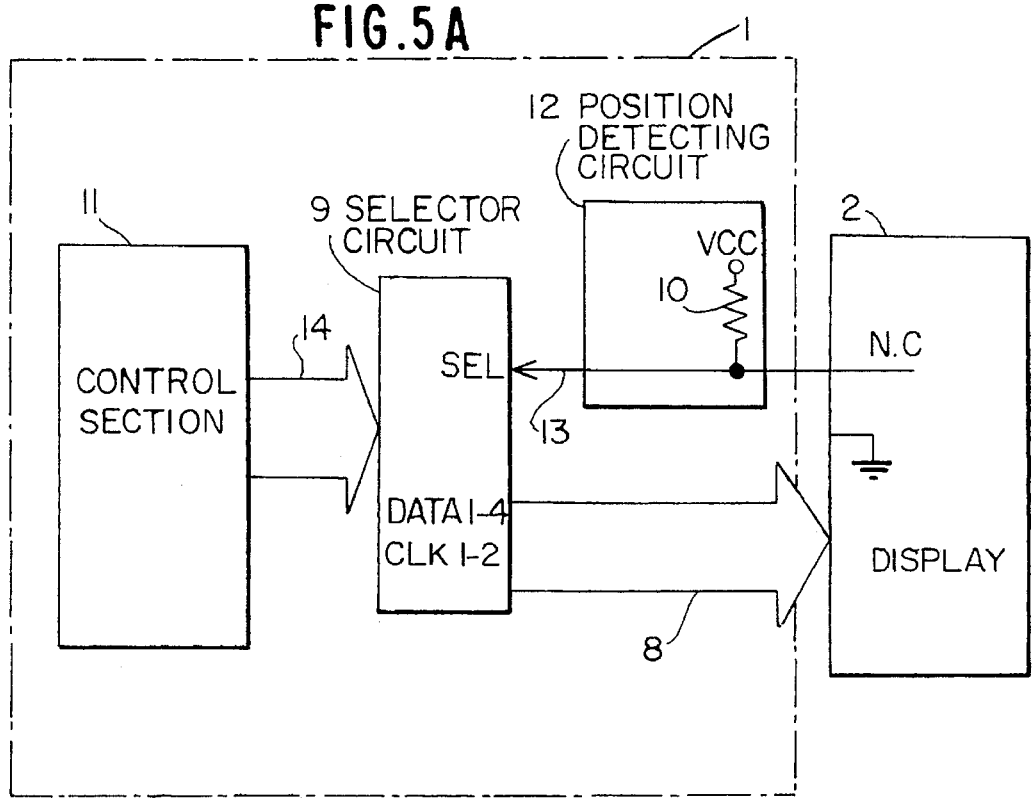
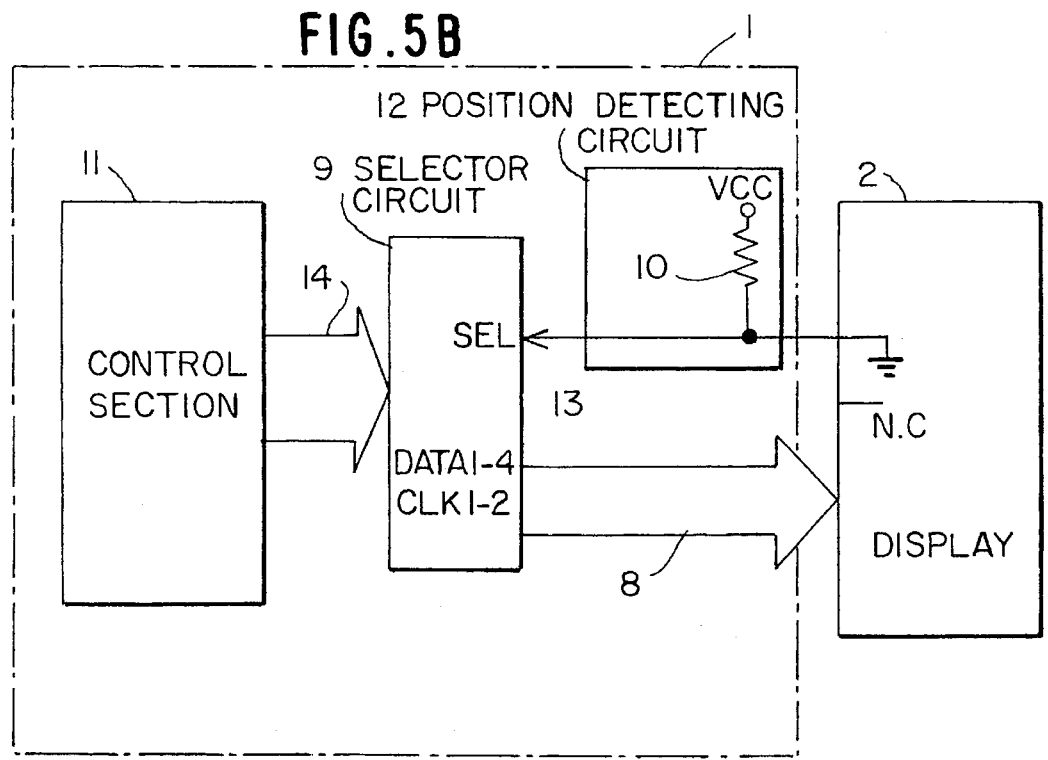

NOTEBOOK TYPE INFORMATION PROCESSING APPARATUS HAVING INPUT FUNCTION WITH PEN

This is a Continuation of Application No. 08/159,228 filed Nov. 30, 1993 now abandoned.

BACKGROUND OF THE INVENTION

The present invention relates to a light weight and compact notebook type information processing apparatus and, more particularly, to a notebook type information processing apparatus having an apparatus body and a display that are separable from each other which allows data and commands to be entered by a pen.

An information processing apparatus of the type described is disclosed in U.S. Pat. No. 4,749,364, by way of example. The apparatus taught in this prior art has an apparatus body constructed integrally with a keyboard accessible for entering data and commands, and a Liquid Crystal Display (LDC) display physically separable from the apparatus body. The apparatus body incorporates a Central Processing Unit (CPU) for executing arithmetic and logical operations in response to data and commands and outputting the results of such operations. The LCD display is implemented as a single panel having an LCD screen on one side thereof for displaying an image, and two first plugs. The two first plugs are used to connect the LCD display to the apparatus body and essential with the LCD display.

The first plugs are each provided with a lever which is pulled when the LCD display is removed from the apparatus body or pushed when the former is set on the latter. Further, one of the two plugs has a female type electric connector therein. A signal line is connected to the connector for feeding a power source signal and control signals to the LCD display. The plugs are each connected to respective sockets provided on the apparatus body. The socket associated with the plug having the female type connector is provided with a male type connector which mates with the female type connector when the plug is inserted into the socket. The male type connector receives the power source signal and control signals sent from the apparatus body to the LCD display. The power source signal and control signals are fed to the LCD display via the female type connector built into the plug. The sockets are rotatably mounted on the apparatus body. The user of the apparatus can bring down the LCD display affixed to the sockets to a position where the display fully covers to the keyboard or a predetermined angular position.

A Cathode Ray Tube (CRT) display may be connected to the apparatus body in place of the LCD display. In this case, the CRT display is connected to the apparatus body via a second plug having a female type connector matching the male type connector of the associated socket, and a cable. When the second plug is received in the associated socket, the male and female connectors mate with each other to complete electrical and mechanical connection. The power source signal and control signals are sent from the apparatus body to the CRT display via the second plug and cable. The user can remove the CRT display from the apparatus body easily by pulling out the second plug from the socket.

However, the conventional apparatus described above has some problems left unsolved, as follows. The LCD display connected to the apparatus body electrically and mechanically is usually positioned such that the screen thereof stands, i.e., faces obliquely upward, so that the operator can see it easily. Hence, when the operator enters data and commands by pressing the screen with a pen associated with the apparatus, the LCD display is bodily moved in the same direction as the pen. This is undesirable from a manipulation standpoint. In addition, while the operator enters data and commands with a pen on the upright LCD display, the operator's arm is continuously lifted above the desk or the like. This causes the operator's arm to fatigue noticeably and makes it difficult for the operator to enter data and commands with the pen for a long time.

SUMMARY OF THE INVENTION

It is, therefore, an object of the present invention to provide a notebook type information processing apparatus which enhances easy manipulation, reduces the fatigue of the operator's arm, and allows the operator to enter data and commands with a pen for a long time.

A notebook type information processing apparatus of the present invention is generally made up of a display and an apparatus body. The display has a screen on one side thereof for displaying numerical data, graphic data, and other data, support supporting the screen rotatably, a first connector provided on the bottom of the support and connectable to the apparatus body mechanically and electrically, and a latch rotatable 180 degrees for locking the display to the apparatus body in either of a normal position and a position turned over in the front-and-rear direction. The apparatus body has a groove engageable with the support and located at the rear of a keyboard used to enter data and commands, a second connector positioned in the groove and connectable to the first connector mechanically and electrically, a pair of rotatable levers engageable with opposite ends of the support for locking the display, a control section for generating control signals meant for the screen, a position detecting circuit for determining whether or not the display is mounted in the normal position electrically, and a selector circuit for selectively outputting the control signals from the control section on this basis of the output of the detecting circuit.

BRIEF DESCRIPTION OF THE DRAWINGS

The features and advantages of the present invention will become apparent from the following description when taken in conjunction with the accompanying drawings in which:

FIGS. 2A, 2B, 2C, and 2D are perspective views demonstrating a procedure for turning a display included in the embodiment 180 degrees and then connecting it to an apparatus body also included in the embodiment;

FIGS. 5A and 5B are block diagrams schematically showing the flow of control signals to occur when the display is mounted on the apparatus body in a normal position and the flow to occur when the former is mounted inside out;

In the figures, the same constituent parts are designated by the same reference numerals.

DETAILED DESCRIPTION OF THE PREFERRED EMBODIMENT

Figure 1:
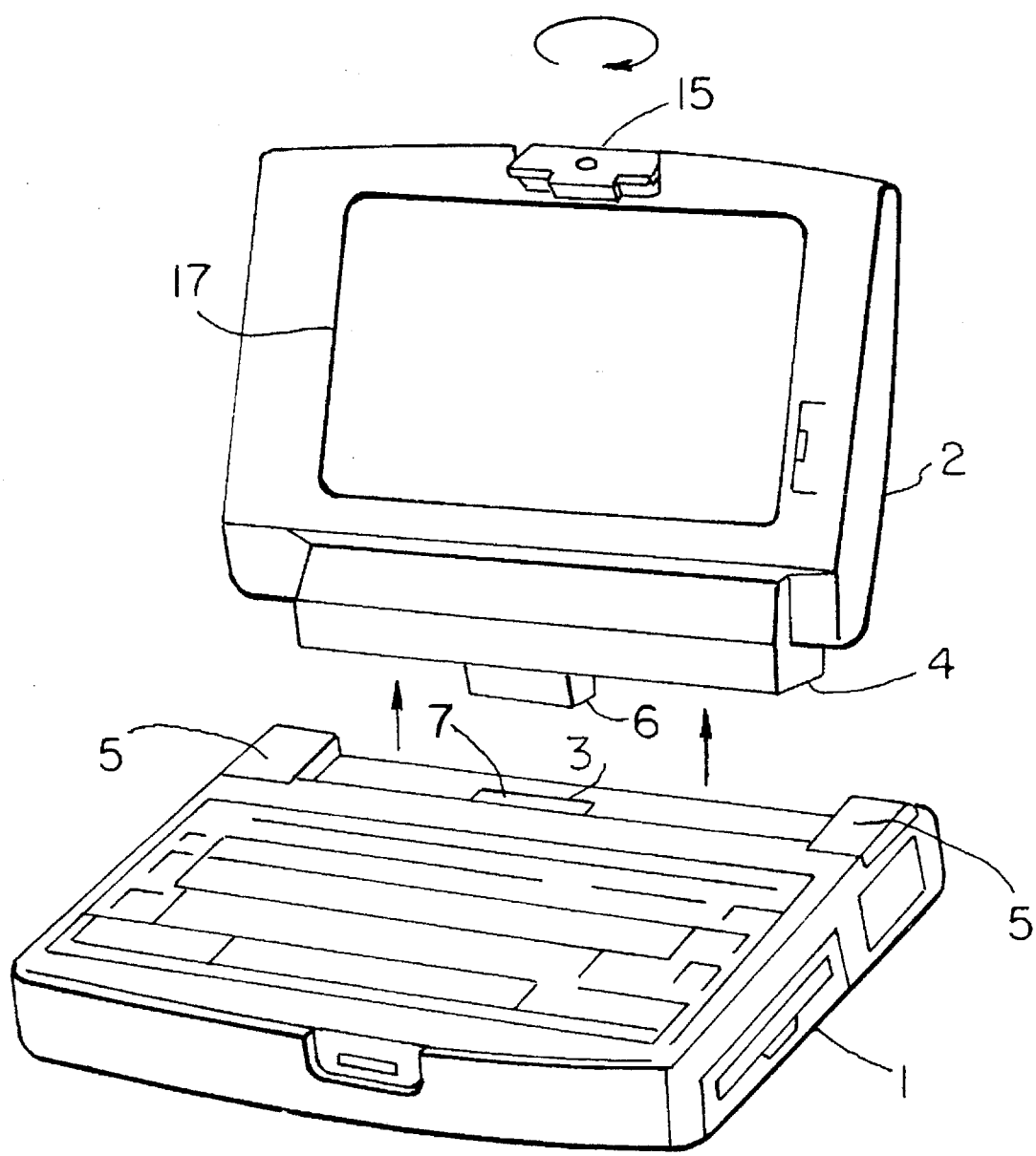
FIG. 1 is a perspective view showing a notebook type information processing apparatus embodying the present invention.
Figure 2C:
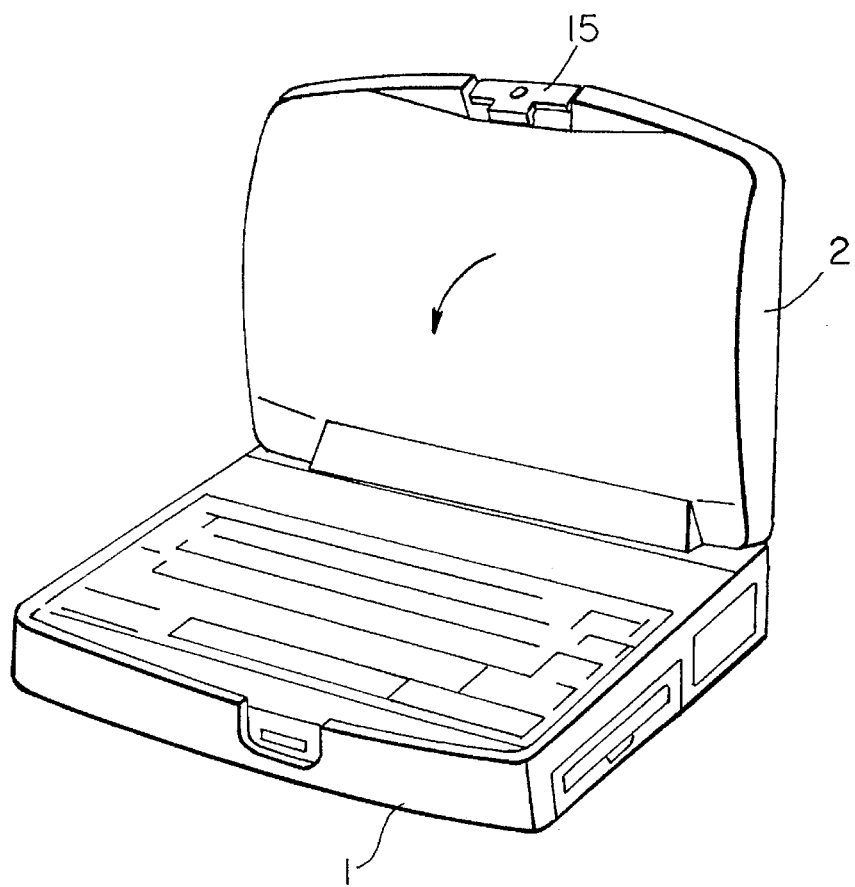
Figure 2D:
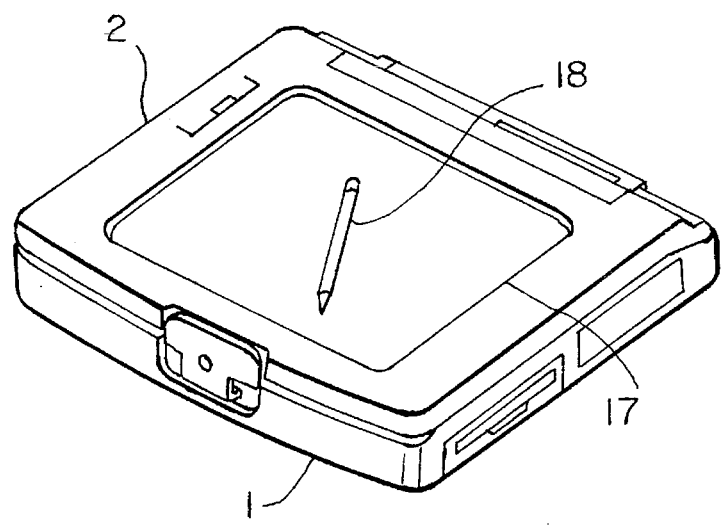

Referring to FIG. 1 of the drawings, a notebook type information processing apparatus embodying the present invention is shown. As shown, the apparatus is generally made up of an apparatus body 1 and a display 2. The display 2 has a screen 17 on one side thereof for displaying numerical data, graphic data, etc. The screen 17 is rotatably mounted on a support 4. A first connector 6 is provided on the bottom of the support 4 and connectable to a second connector 7, which will be described, mechanically and electrically. A latch 15 is provided on the display 2 and rotatable 180 degrees to lock the display 2 with the screen 17 facing inside or outside. The apparatus body 1 is formed with a groove 3 at the rear end of a keyboard. The support 4 of the display 2 is received in the groove 3. The second connector 7 is positioned within the groove 3 and is connectable to the first connector 6 mechanically and electrically. A pair of levers 5 are rotatably mounted on the apparatus body I and engaged with opposite ends of the support 4 to connect the display 2 to the body 1.

The display 2 may be turned over 180 degrees and mounted on the apparatus body 1 inside out, as will be described with reference to FIGS. 2A–2D. Assume that the apparatus is in a closed position with the keyboard of the apparatus body 1 and the screen 17 of the display 2 facing each other, and that the user of the apparatus desires to use a pen input function in place of a keyboard input function. A hook forming part of the latch 15 of the display 2 is released (see FIG. 2A). After the display 2 has been rotated away from the apparatus body 1 to a upright position, the levers 5 are rotated outwardly (see FIG. 3A), and then the display 2 is bodily lifted away from the apparatus body 1. The latch 15 provided on the display 2 is rotated 180 degrees (see FIG. 2B).

Figure 3A:
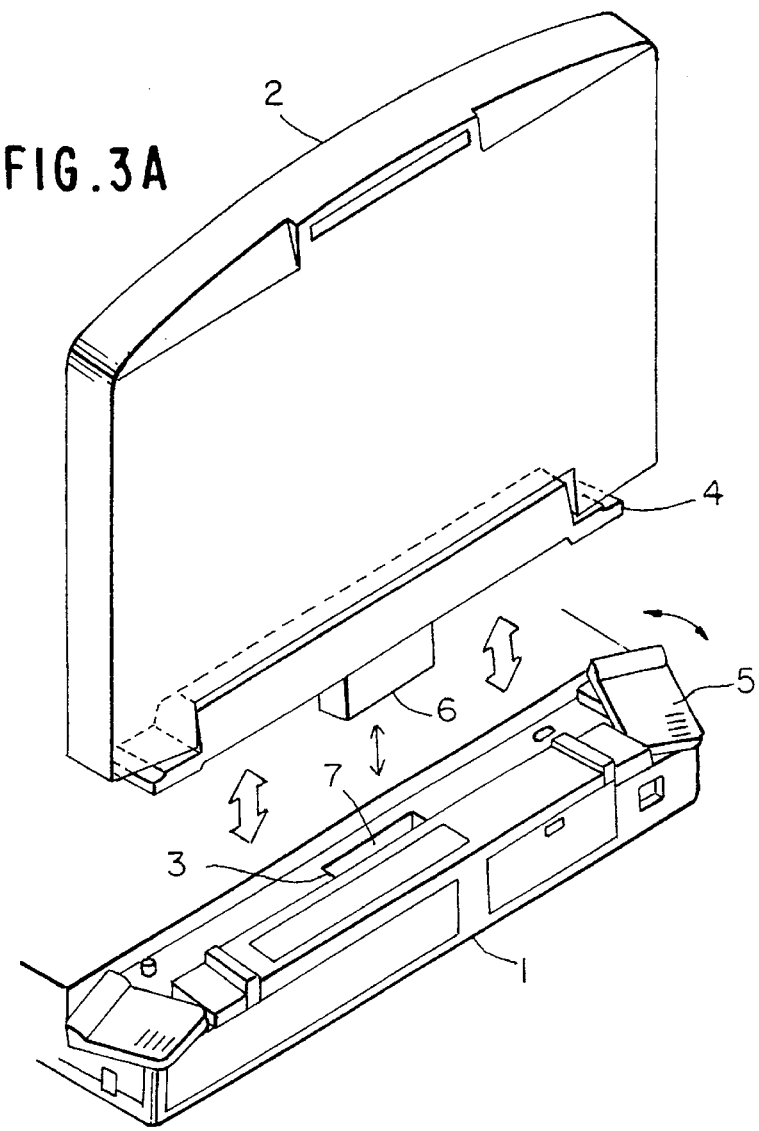
FIGS. 3A and 3B are fragmentary views representative of a relation between a first and a second connector provided in the display and the apparatus body, respectively.
Figure 3B:
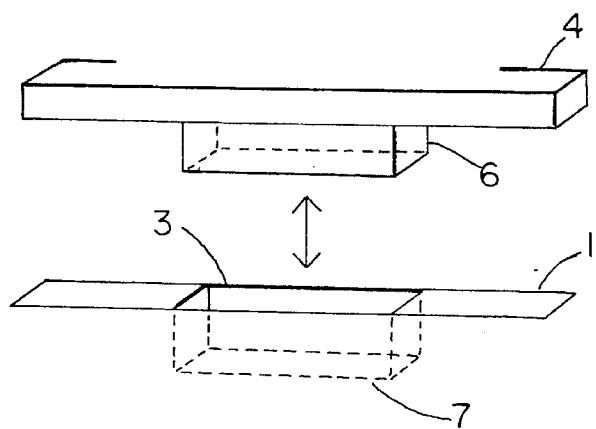

Subsequently, the display 2 is turned 180 degrees such that the screen 17 thereof faces outside, i.e., the display 2 is positioned inside out. After the display 2 in such a position has been re-inserted into the apparatus body 1, the levers 5 are rotated inwardly to connect the display 2 to the apparatus body 1. Finally, the display 2 is lowered to the closed position and then locked to the apparatus body 1 by the hook of the latch 15 (see FIG. 2C). As a result, the display 2 is locked to the apparatus body 1 with the screen 17 facing upward (see FIG. 2D). In this condition, the user can enter data and commands by pressing the screen 17 with a pen 18, FIGS. 3A and 3B show the configurations of the first and second connectors 6 and 7 specifically, The connector protrudes from the bottom of the support 4 of the display 2 while the connector 1 is positioned in the groove 3 of the apparatus body 1, as stated earlier. The connectors 6 and both have a symmetric configuration in the right-and-left direction. This allows the display 2 to be connected to the apparatus body with the screen 17 thereof facing inside outside, as desired.

Figure 4A:
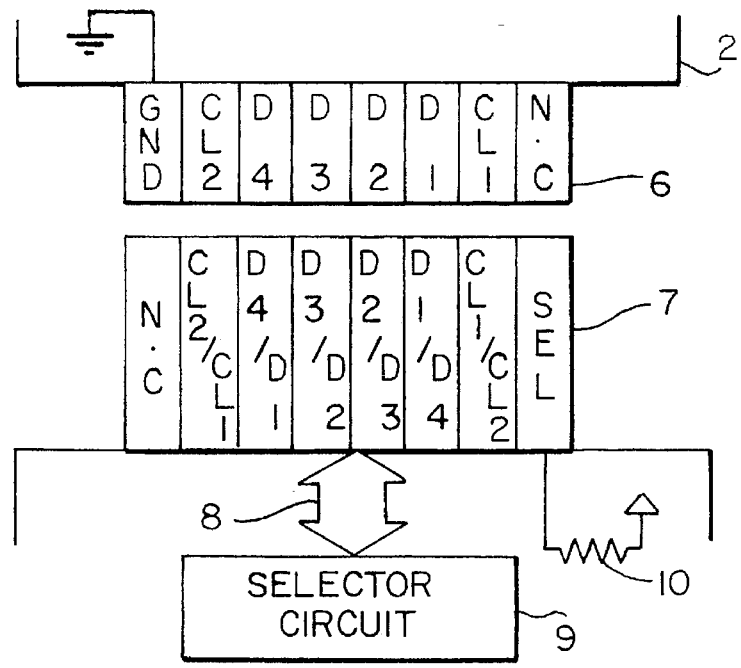
FIGS. 4A and 4B are views representative of electrical connection of the first and second connectors.
Figure 4B:
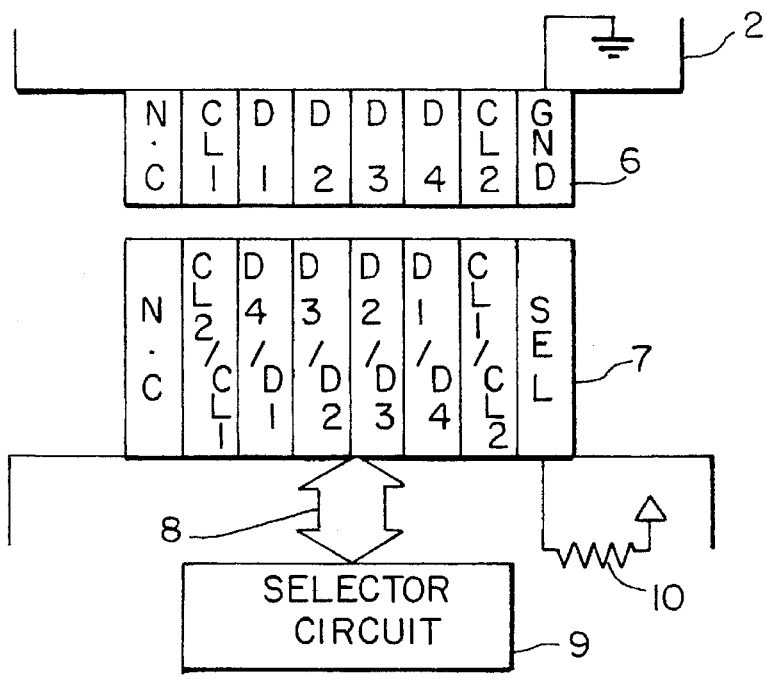

FIGS. 4A and 4B are representative of an electrical relation between the connectors 6 and 7. As shown, signal terminals included in the connector 7 and signal terminals included in the connector 6 are exactly symmetrical in respect of the order of arrangement in the right-and-left direction.

FIGS. 5A and 5B snow respectively the flow of control signals to occur when the display 2 is mounted on the apparatus body 1 with the screen 17 acing inside and the flow to occur when the former is mounted on the latter with the screen 17 facing outside. Let the former position and the latter position be referred to as a normal position and an inverted position, respectively. As shown, a control section 11, a position detecting circuit 12 and a selector circuit 9 are built in the apparatus body 1. The control section 11 generates various control signals 14 to be sent to the screen 17 of the display 2. The position detecting circuit 12 determines if the display 2 is mounted on the apparatus body I in the normal position or in the inverted position electrically. The selector circuit 9 selects particular control signals from the control section 11 in response to a position signal generated by the detecting circuit 12. The position detecting circuit 12 is implemented by a pull-up resistor 10 by way of example and responsive to the level of a signal line 13 connecting the display 2 and apparatus body 1. When the signal line 13 is in a high level, the detecting circuit 12 determines that the display 2 is mounted on the apparatus body 1 in the normal position. Then, the detecting circuit 12 delivers a high level signal to the selector circuit 9 as a select signal over the signal line 13. In response, the selector circuit 9 determines that the display 2 is held in the normal position. In this case, the control signals 14 generated by the control section 11 and meant for the display 2 are directly sent to the display 2 via the selector circuit 9 as display data signals 8 (see FIG. 5A).

Assume that the signal line 13 is in a low level. Then, the position detecting circuit 12 determines that the display 2 is mounted on the apparatus body I in the inverted position with the screen 17 facing outside, and delivers a low level signal to the selector circuit 9 via the signal line 13 as a select signal. In response, the selector circuit 9 inverts the spatial orders of the control signals 14 from the control section 11 and then sends them to the display 2 as display data signals 8 (see FIG. 5B).

As stated above, whether or not the display 2 is mounted on the apparatus body 1 inside out is automatically determined by the combination of the position detecting circuit 12 and selector circuit 9. This decision is made when a power switch (not shown) provided on the apparatus body 1 is turned on. The selector circuit 9 selects control signals 14 matching the position of the display 2 relative to the apparatus body 1 and sends them to the display 2 as display data signals 8. Hence, numerical data or graphic data, for example, appear on the display 2 in a correct orientation in the up-and-down direction and right-and-left direction.

Figure 6:
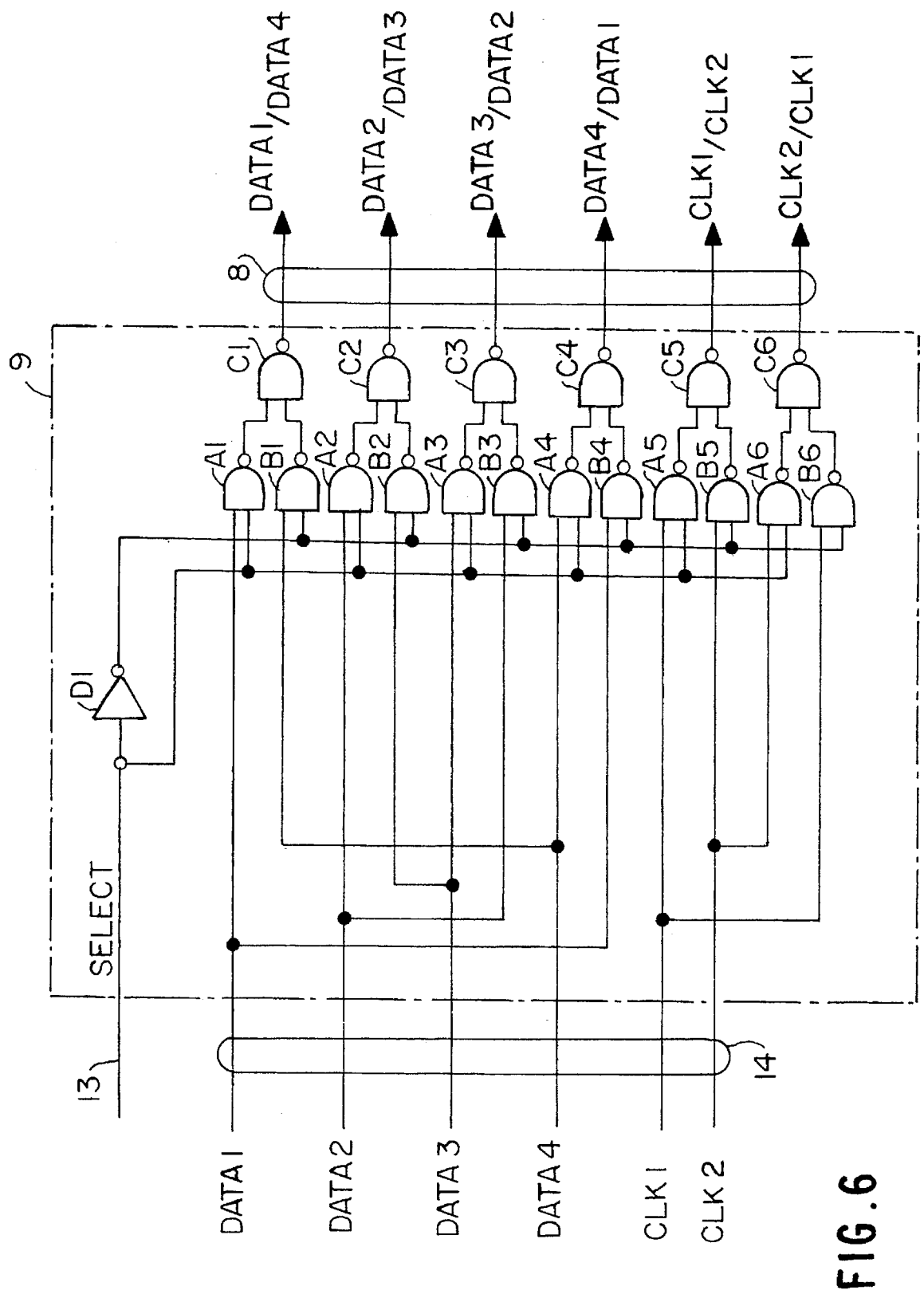
FIG. 6 is a circuit diagram showing a specific construction of a selector circuit included in the apparatus body.

FIG. 6 shows a specific construction of the selector circuit 9. As shown, the control signals 14 to be sent from the control section 11 to the display 2 are represented by DATA1-DATA4, CLK1, and CLK2. The select signal to be generated by the position detecting circuit 12 and indicative of the position of the display 2 is labeled SELECT. Further, the display data signals 8 to be sent from the selector circuit 9 to the display 2 are represented by DATA1-DATA4/ DATA4-DATA1 and CLK1-CLK2/CLK2-CLK1.

Assume that the display 2 is mounted on the apparatus body 1 in the normal position. Then, the position detecting circuit 12 produces a high level signal on the signal line 13, turning the signal SELECT meant for the selector 9 to a high level. As the high level signal SELECT is applied to NAND gates A1–A6, the NAND gates A1–A6 produce NAND of DATA1-DATA4, CLK1 and CLK2 fed thereto from the control section 11. At the same time, the high level signal SELECT is routed through an inverter D1 to NAND gates B1–B6. Hence, a low level signal SELECT is constantly applied to the NAND gates B1–B6, causing them to output high level signals continuously. NAND gates C1–C6 receive respectively the high level signals from the NAND gates B1–B6 continuously and, therefore, produce NAND of NAND of DATA1-DATA4, CLK1 and CLK2 fed from the NAND gates A1–A6. As a result, the selector 9 determines that the display 2 is mounted on the apparatus body I in the normal position, and sends the control signals 14 (DATA1-DATA4, CLK1 and CLK2) directly to the display 2 as display data signal 8.

When the display 2 is mounted on the apparatus body 1 in the inverted position with the screen 17 thereof facing outside, the position detecting circuit 12 produces a low level signal on the signal line 13. This turns the signal SELECT for the selector circuit 9 to a low level. In this case, the NAND gates A1–A6 output high level signals continuously since the signal SELECT remains in a low level. At the same time, the low level signal SELECT is continuously applied to the NAND gates B1–B6 via the inverter D1, causing them to output NAND of DATA4-DATA1, CLK2, and CLK1 fed from the control section 11. The NAND gates C1–C6 receive respectively the high level signals from the NAND gates A1–A6 continuously and, therefore, produce NAND of NAND of DATA1-DATA4, CLK2, and CLK1 fed from the NAND gates B1–B6. As a result, the selector circuit 9 determines that the display 2 is mounted on the apparatus body 1 inside out, inverts the control signals 14 (DATA1-DATA4, CLK1, and CLK2) fed from the control section 11 in the right-and-left direction, and then sends the inverted control signals 14 to the display 2 as display data signals 8 (DATA4-DATA1, CLK1 and CLK2).

Figure 7A:
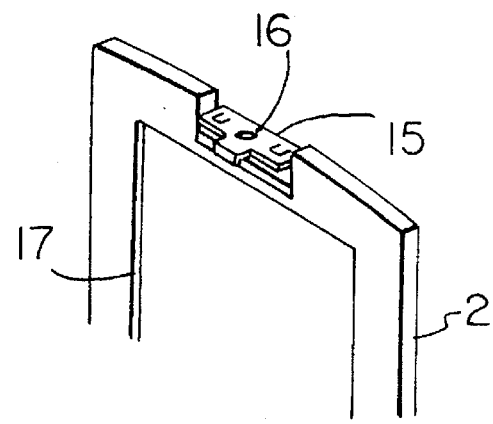
FIGS. 7A, 7B and 7C are fragmentary perspective views showing a latch for locking the display to the apparatus body.
Figure 7B:
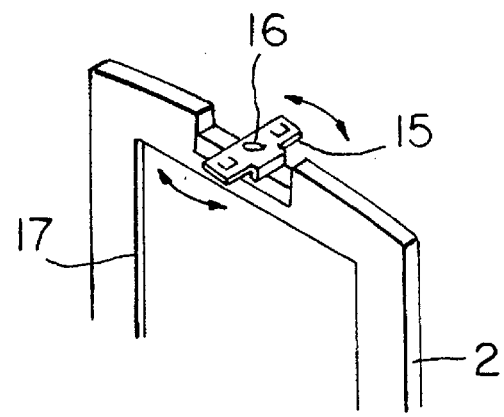
Figure 7C:
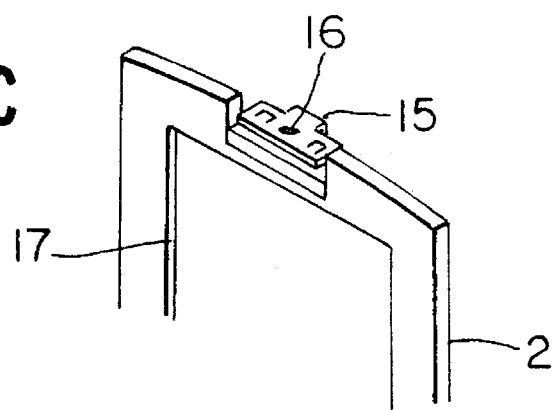

The latch 15 of the display 2 is shown illustrated in FIGS. 7A, 7B and 7C. As shown, the latch 15 is provided on one edge of the display 2 above the screen 17 and rotatable 180 degrees about a fulcrum 16. When the display 2 is mounted on the apparatus body 1 in the normal position, the hook located at the center of the latch 15 is caused to protrude to the screen 17 side and then fixed in place (see FIG. 7A). When the display 2 is mounted on the apparatus body 1 in the inverted position or inside out, the latch 15 is rotated 180 degrees such that the hook thereof protrudes toward the rear of the screen 17 (see FIG. 7C).

Figure 8A:
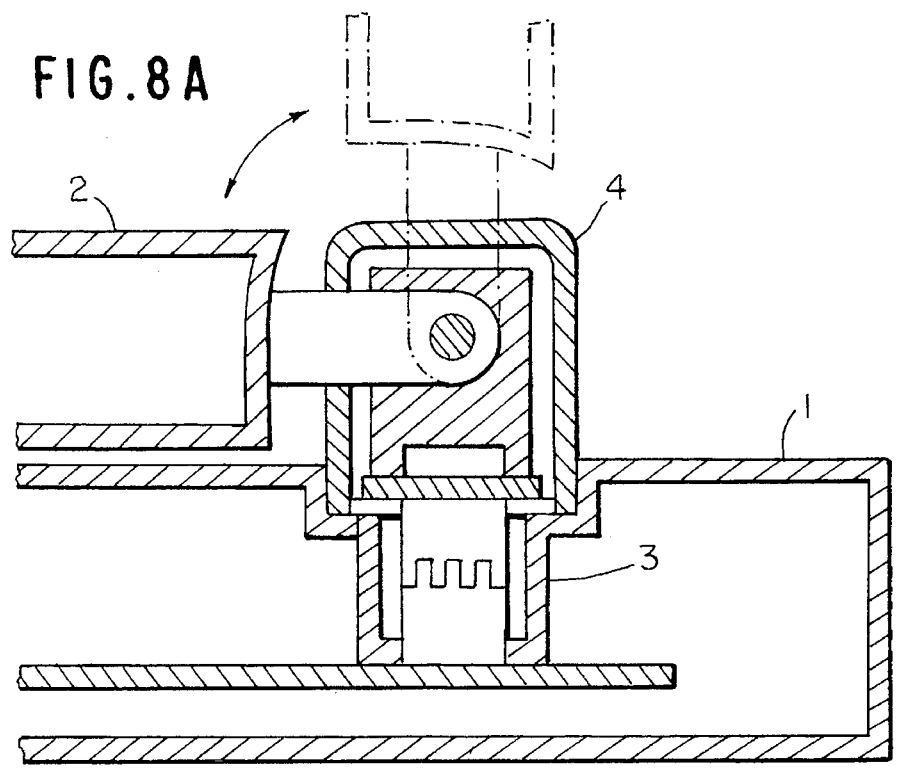
FIGS. 8A and 8B are fragmentary enlarged sections each showing a relation between the apparatus body and the display in a particular condition.
Figure 8B:
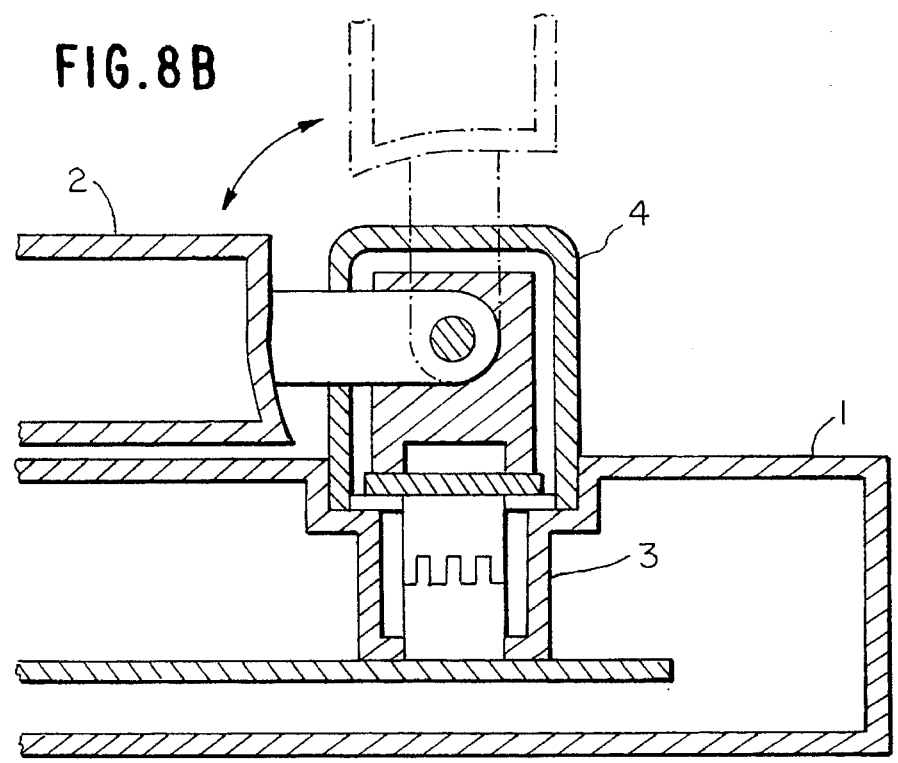

FIGS. 8A and 8B show the display 2 mounted on the apparatus body in the normal position and the inverted position, respectively. The first connector 6 provided on the bottom of the support 4 is connected to the screen (not shown) by a plurality of signal lines (not shown) and receives a power source signal and various control signals from the apparatus body 1. The second connector 7 positioned in the groove 3 of the apparatus body 1 are connoted to other circuitry built in the apparatus 1 by a plurality of signal lines (not shown) and sends the power source signal and control signals to the display 2. The support 4 mounts the display 2 on the apparatus body such that the former is rotatable relative to the latter about a shaft (not shown) disposed in the support 4. To connect the display 2 to the apparatus body 1, after the support 4 has aligned with the groove 3, the display 2 is pressed downward to insert the support 4 into the groove 3. As a result, connectors 6 and 7 are caused to mate each other.

Figure 9A:
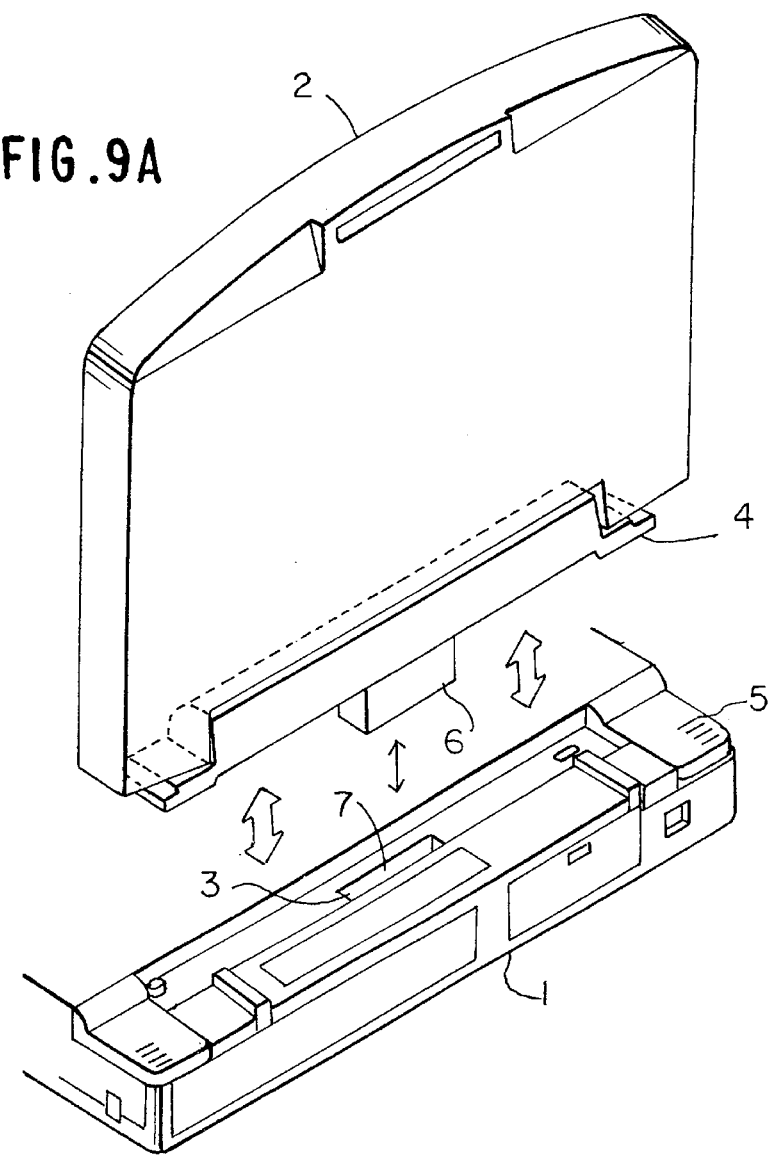
FIGS. 9A and 9B are views illustrating the configuration and operation of levers provided on the apparatus body.
Figure 9B:
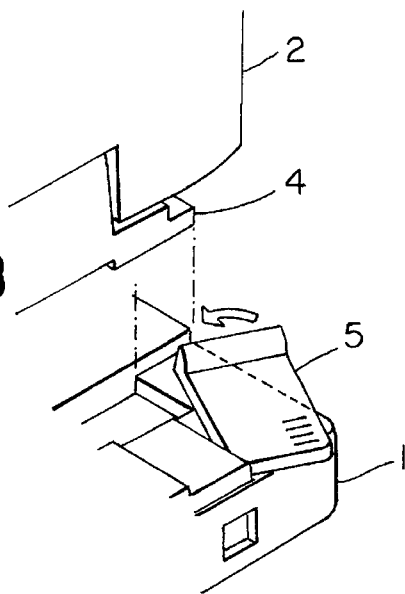

Referring to FIGS. 9A and 9B, there are shown the levers 5 provided at opposite ends of the apparatus body, i.e., at opposite sides of the groove B and engageable with opposite ends of the support 4. Usually, the levers 5 are held in a folded or closed position. To remove the display 2 from the apparatus body 1 or to mount the former on the latter, the levers 5 are rotated outwardly by the user. Assume that the display 2 should be removed from the apparatus body 1. Then, the levers 5 are rotated outwardly to release them from opposite ends of the support 4 of the display 2, Subsequently, the display 2 is bodily lifted while being held together with the support 4 by the user. As the support 4 of the display 2 is pulled out from the groove 3 of the apparatus body 1, the display 2 is fully separated from the body 1.

The groove 3 of the apparatus body 1 is symmetrical in the right-and-left direction. This allows the display 2 to be mounted on the apparatus body 1 in either of the two different positions by being rotated 180 degrees. Further, the levers 5 engaging with opposite ends of the support 4 of the display 2 surely lock the display 2 to the apparatus body 1 without regard to the position of the display 2. Since the levers 5 are rotatably positioned on the apparatus body 1, they can be rotated by the user easily and, therefore, facilitate the mounting and dismounting of the display 2.

In summary, a notebook type information processing apparatus of the present invention is generally made up of a display and an apparatus body. The display has a screen on one side thereof for displaying numerical data, graphic data, and other data, a support supporting the screen rotatably, a first connector provided on the bottom of the support and connectable to the apparatus body mechanically and electrically, and a latch rotatable 180 degrees for locking the display to the apparatus body in either of a normal position and an inverted position. The apparatus body has a groove engageable with the support and located at the rear of a keyboard used to enter data and commands, a second connector positioned in the groove and connectable to the first connector mechanically and electrically, a pair of rotatable levers engageable with opposite ends of the support for locking the display, a control section for generating control signals meant for the screen, a position detecting circuit for determining whether the display is mounted in the normal position or the inverted position, and a selector circuit for selectively outputting the control signals from the control section on the basis of the output of the detecting circuit. Hence, the apparatus allows the user to enter data and commands with a pen easily, reduces the fatigue of the user's arm, and allows the entering operation to be continued for a long time.

While the present invention has been described in conjunction with the preferred embodiment thereof, it will now be readily possible for those skilled in the art to put the present invention into practice in various other manners.

What is claimed is:

1. A notebook type information processing apparatus having an input function with a pen, comprising:

an apparatus body; and a display, wherein said display includes a first connector through which control signals are transmitted, wherein said apparatus body includes:

a groove formed on said apparatus body for selectively locking and unlocking said display to and from said apparatus body; and connector means, connectable to said first connector and through which said control signals are transmitted from and to said apparatus body in a configurationally and electrically symmetrical condition, for connecting said display to said apparatus body, and wherein said connector means comprises:

determining means for determining which of two orientation states said display is connected to said apparatus body, wherein said display is selectively connected to said apparatus body in a first and a second orientation state, and said display is changed back and forth between said first and said second orientation states by disconnecting said display from said apparatus body, turning said display by 180° around a center line of said display, said center line being substantially perpendicular to a connecting line between said display and said apparatus body, and reconnecting said display to said apparatus body;

a second connector connectable to said first connector through which said control signals are transmitted from and to said first connector; and an arranging circuit for arranging spatial orders of said control signals on the basis of said orientation states, said arranging circuit maintaining said spatial orders of said control signals from and to said second connector when said determining means determines said display is at one of said two orientation states, and said arranging circuit arranging said spatial orders of said control signals in the reverse order and supplying said arranged control signals from and to said second connector when said determining means determines said display is at the other of said two orientation states.

2. The apparatus as claimed in claim 1, wherein said display comprises a latch rotatable 180 degrees for locking said display to said apparatus body when said display is closed while selectively facing inside or outside.

3. A notebook type information processing apparatus as recited in claim 1, wherein said determining means comprises a pull-up resistor, and wherein a signal line connects said display and said apparatus body, said determining means being responsive to a level of said signal line.

4. A notebook type information processing apparatus as recited in claim 1, wherein said processing apparatus includes a support on which said display is rotatably supported, said first connector protruding from said support, and wherein said connector means is provided in said groove in said apparatus body, said first connector being mechanically and electrically connected with said second connector of said connector means in said groove.

* * * * *